(12) United States Patent
Zuo et al.

(10) Patent No.: US 11,568,098 B2
(45) Date of Patent: Jan. 31, 2023

(54) DESIGNING CONVECTIVE COOLING CHANNELS

(71) Applicant: Autodesk, Inc., San Francisco, CA (US)

(72) Inventors: Zhihao Zuo, Victoria (AU); Shoudong Xu, Victoria (AU); Huagang Yu, Victoria (AU); Arpan Biswas, Portland, OR (US); Nandakumar Santhanam, Ithaca, NY (US)

(73) Assignee: AUTODESK, INC, San Francisco, CA (US)

( * ) Notice: Subject to any disclaimer, the term of this patent is extended or adjusted under 35 U.S.C. 154(b) by 329 days.

(21) Appl. No.: 16/414,391

(22) Filed: May 16, 2019

(65) Prior Publication Data

US 2019/0354656 A1 Nov. 21, 2019

Related U.S. Application Data

(60) Provisional application No. 62/742,594, filed on Oct. 8, 2018, provisional application No. 62/672,342, filed on May 16, 2018.

(51) Int. Cl.
| | |
|---|---|
| *G06F 30/17* | (2020.01) |
| *G06T 17/10* | (2006.01) |
| *G06T 19/20* | (2011.01) |
| *G06F 30/23* | (2020.01) |

(52) U.S. Cl.
CPC .............. *G06F 30/17* (2020.01); *G06F 30/23* (2020.01); *G06T 17/10* (2013.01); *G06T 19/20* (2013.01)

(58) Field of Classification Search
CPC ...... G06F 30/17; G06F 30/23; G06F 2113/08; G06F 2119/08; G06T 17/10; G06T 19/20; A61B 17/15; A61B 34/20; B29C 45/7312; F01D 5/005; F01D 5/147; F01D 5/186; F28F 9/22; G01C 15/002; G01M 15/05; H04L 23/47

See application file for complete search history.

(56) References Cited

U.S. PATENT DOCUMENTS

| | | | | |
|---|---|---|---|---|
| 7,134,486 | B2* | 11/2006 | Santiago ............ | B01D 19/0031 165/104.28 |
| 7,836,597 | B2* | 11/2010 | Datta .................. | F28D 15/0266 29/890.041 |
| 8,209,839 | B1* | 7/2012 | Brostmeyer ............ | F01D 5/005 29/407.05 |

FOREIGN PATENT DOCUMENTS

| | | | | | |
|---|---|---|---|---|---|
| CN | 1636124 | A * | 7/2005 | .......... | H04L 23/473 |
| CN | 104657565 | A * | 5/2015 | | |
| CN | 104778289 | A * | 7/2015 | | |
| CN | 105631110 | A * | 6/2016 | ............. | G06F 30/17 |
| CN | 106003625 | A * | 10/2016 | ......... | B29C 45/7312 |

(Continued)

OTHER PUBLICATIONS

"Tessellated model", Google.com, Aug. 5, 2021.*

(Continued)

*Primary Examiner* — Kandasamy Thangavelu
(74) *Attorney, Agent, or Firm* — Gates & Cooper LLP

(57) ABSTRACT

A method, apparatus, and system provide the ability to design a convective cooling channel in a computer. Input data is acquired and includes a geometry of an object to be cooled, a design objective, and boundary conditions. Channel designs corresponding to the input data are generated using an iterative topology optimization. One of the channel designs is selected and output.

16 Claims, 6 Drawing Sheets

(56) References Cited

FOREIGN PATENT DOCUMENTS

| CN | 106968721 | A | * | 7/2017 | ............. F01D 5/147 |
| CN | 107036483 | A | * | 8/2017 | ................ F28F 9/22 |
| CN | 107622145 | A | * | 1/2018 | |
| CN | 107702662 | A | * | 2/2018 | ........... G01C 15/002 |
| CN | 108007693 | A | * | 5/2018 | ............ G01M 15/05 |
| CN | 108024699 | A | * | 5/2018 | ............. A61B 34/20 |
| EP | 2818637 | B1 | * | 4/2017 | ............. F01D 5/186 |
| WO | WO 2017004669 | A1 | * | 1/2017 | ............. A61B 17/15 |

OTHER PUBLICATIONS

U.S. Pat. No. 7,836,597 B2, compressed version, Nov. 2010.*
Cao, J., et al., "Point Cloud Skeletons via Laplacian-Based Contraction", IEEE International Conference on Shape Modeling and Applications (SMI) 2010, pp. 1-11.
Au, O-K.C, et al., "Skeleton Extraction by Mesh Contraction", ACM Transactions on Graphics, Aug. 2008, pp. 44:1-44:10, vol. 27, No. 3.
"The Boost Graph Library (BGL)", Boost C++ Libraries, www.boost.org/doc/libs/1_66_0/libs/graph/doc/, as downloaded Nov. 3, 2020, pp. 1-4, Copyright © 2000-2001.
Dilgen, S.B., et al., "Density based topology optimization of turbulent flow heat transfer systems", Structural and Multidisciplinary Optimization, 2018, pp. 1905-1918, vol. 57, No. 5.
Saha, P.K., et al., "A survey on skeletonization algorithms and their applications", Pattern Recognition Letters, 2016, pp. 3-12, vol. 76.
Challis, V.J., et al., "Level set topology optimization of fluids in Stokes flow", International Journal for Numerical Methods in Engineering, 2009, pp. 1284-1308, vol. 79.

* cited by examiner

DESIGNING CONVECTIVE COOLING CHANNELS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/742,594, filed on Oct. 8, 2018, with inventor(s) Zhihao Zuo, Shoudong Xu, Huagang Yu, Arpan Biswas, and Nandakumar Santhanam, entitled "METHOD OF DESIGNING CONVECTIVE COOLING CHANNELS,"; and Provisional Application Ser. No. 62/672,342, filed on May 16, 2018, with inventor(s) Zhihao Zuo and Shoudong Xu, entitled "METHOD OF DESIGNING CONVECTIVE COOLING CHANNELS,".

BACKGROUND OF THE INVENTION

1. Field of the Invention

The present invention relates generally to computer-aided design (CAD) for manufacturing, and in particular, to a method, apparatus, system, and article of manufacture for designing convective cooling channels.

2. Description of the Related Art (Note: This application references a number of different publications as indicated throughout the specification by reference author names enclosed in brackets, e.g., [Doe]. A list of these different publications ordered according to these reference author names can be found below in the section entitled "References." Each of these publications is incorporated by reference herein.)

Cooling system design has become critical for developing new products: in injection molding, mass production of plastic products requires a shorter manufacturing cycle in the quick-changing consumer culture, for which more efficient cooling of the molds is desired (e.g., via the conformal cooling technique); in automotive manufacturing, more compact engines are demanded by the market for reduced mass/size and improved fuel efficiency, which creates a difficult scenario for designing an effective cooling system; other manufacturing processes and applications that involve convective cooling include, but not limited to, die-casting, electric circuit boards, generators.

Convective cooling is an efficient way of removing heat from a source by flowing fluids such as air, water and special coolants through a channel. Usually, designing an effective convective cooling system requires in-depth understanding of fluid dynamics, thermal transfer, as well as practical skills such as numerical analysis; it is traditionally a trial-and-error procedure that is very time consuming. Furthermore, it is difficult to manually generate a cooling channel design using existing CAD design software environments.

SUMMARY OF THE INVENTION

Embodiments of the invention provide an approach that automates and optimizes the complicated design process of designing convective cooling channels. Given an object to be cooled (e.g., an injection molded part, an engine block or a computer CPU (central processing unit)), embodiments of the invention automatically generate multiple efficient convective cooling channel designs and output results as geometries in editable and usable formats. Embodiments include a topology optimization technique to the heat convection problem. Further, multiple objectives are considered including but not limited to: channel flow pressure drop, heat removal, temperature range, temperature uniformity, fluid volume, and channel manufacturability.

Topology optimization is able to assist a design process by automatically generating geometries subject to given design criteria. Traditionally, topology optimization has been focused on the design of solids, such as a steel bracket where improved stiffness is sought. Design optimization for fluids is a more difficult problem and thus is a relatively newer topic even in academic research; it is tremendously non-linear and the underlying technique—computational fluid dynamics itself is already computational costly. The benefits of topology optimization for fluids are obvious and has broad applications: ventilation, aerodynamics of aircraft and vehicles, convective cooling, etc.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Connective Cooling Channel Design Logical Flow

Figure 1:
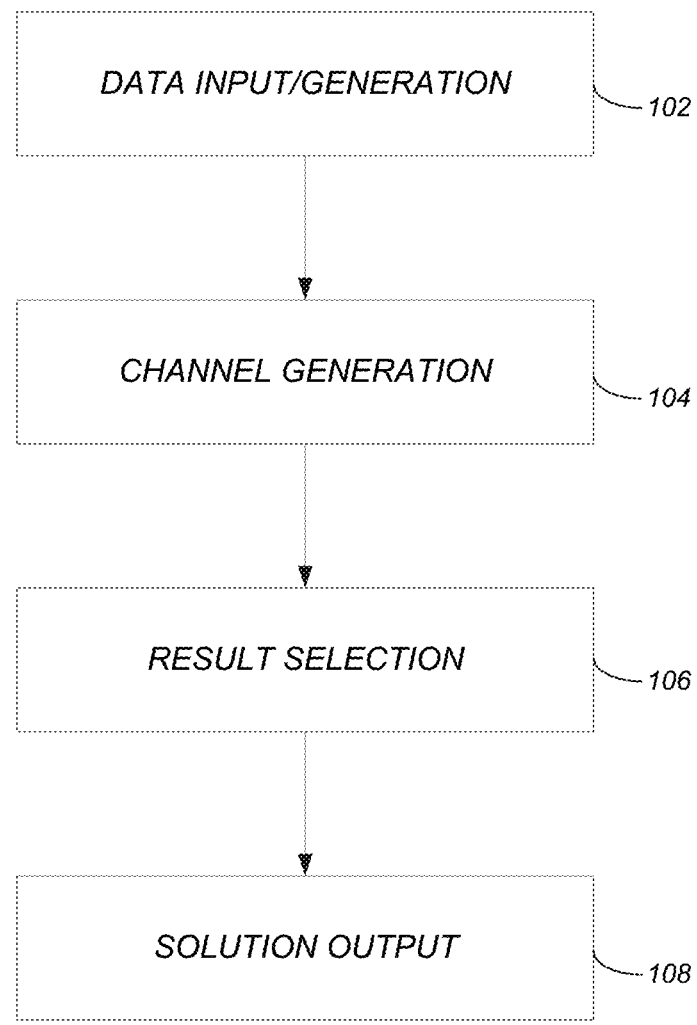
FIG. 1 illustrates the logical flow for designing convective cooling channels in accordance with one or more embodiments of the invention.

The design of convective cooling channels can be divided into a series of steps. FIG. 1 illustrates the logical flow for designing convective cooling channels in accordance with one or more embodiments of the invention. The steps include the input of data or definitions acquisition/generation 102, channel design generation 104, result selection 106, and solution output 108. Each of the steps 102-108 are described in further detail below.

Data Input/Generation 102

In step 102, input data is obtained/acquired/generated into/by the CAD application. The input data is the data required to perform the convective cooling channel design. Such input may include the geometry of the object to be cooled, the design objective(s), basic boundary conditions (BCs) for the design, and optionally—the initial design of the channels. The input data may be input by a user (i.e., the input data are received as input from a user). The design objective may be a single design objective or a combination of multiple design objectives. The basic boundary conditions may include the locations of a coolant inlet and outlet, an inlet coolant type and temperature, and an outlet pressure.

Figure 2:
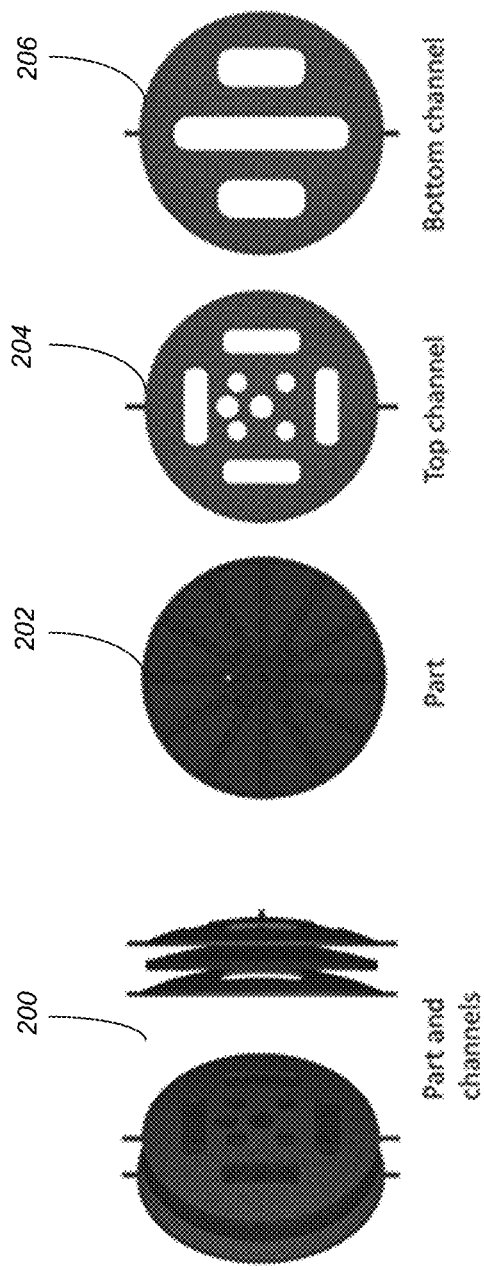
FIG. 2 illustrates exemplary input data in accordance with one or more embodiments of the invention.

FIG. 2 illustrates exemplary input data in accordance with one or more embodiments of the invention. More specifically, FIG. 2 illustrates a satellite dish example 200 (illustrated as a three-dimensional view of the part and channels) with the part 202 to be cooled, and the original conformal cooling channels (i.e., top channel 204 and bottom channel 206).

As an alternative to the user entering all of the input data, the user may input the object to be cooled, size of the design domain and the desired design objectives. In response thereto, a pre-processor may automatically generate the rest of the needed input parameters/boundary conditions such as the inlet and outlet locations, inlet flow rates and temperature, and/or generate corresponding initial cooling channel designs (e.g., top channel 204 and bottom channel 206) for the subsequent topology optimization engine to start with. All the inputs can be grouped into complete input sets, namely each set contains necessary inputs for a successful channel generation 104 (e.g., the combination of the geometry, the design objectives, and the boundary conditions, etc.). The generation of required inputs can be done by automatically searching a pre-installed library for available mold and coolant materials, and recommended boundary conditions for each material choice, then by generating a permutation of the combination of the candidate parameters and values. The generation of the position of BCs can be input by the user along with the input model of the object to be cooled and the design domain, or be identified by sophisticated machine learning algorithms which however is out of the scope of this patent.

For each set of inputs, an iterative topology optimization run may be started and generates a resulting channel design corresponding to the set of inputs.

Channel Design Generation 104

The mathematical description of the physics in convective cooling is given below:

$$\frac{\partial}{\partial t}(\rho_f u) + \nabla \cdot (\rho_f uu) = \nabla \cdot (\mu \nabla u) - \nabla P + f \quad (1)$$

$$\nabla \cdot (\rho_f u) = 0 \quad (2)$$

$$\rho_f C_p u \cdot \nabla T - \nabla \cdot (k_f \nabla T) = Q_f \quad (3)$$

$$-\nabla \cdot (k_s \nabla T) = Q_s \quad (4)$$

where $\rho_f$ is the mass density of the fluid, u is the flow velocity vector, P the flow pressure and f the flow body force vector, $\mu$ the fluid viscosity, $C_p$ the fluid specific heat, T the temperature, $k_f$ the thermal conductivity of the fluid, $Q_f$ and $Q_s$ are the heat loads on the fluid and solid domains respectively, $k_s$ is the thermal conductivity of the solid. In this description, the flow or fluid means the cooling channel fluid; the solid means the solids that surrounds the fluid (e.g., an injection mold core).

Figure 3:
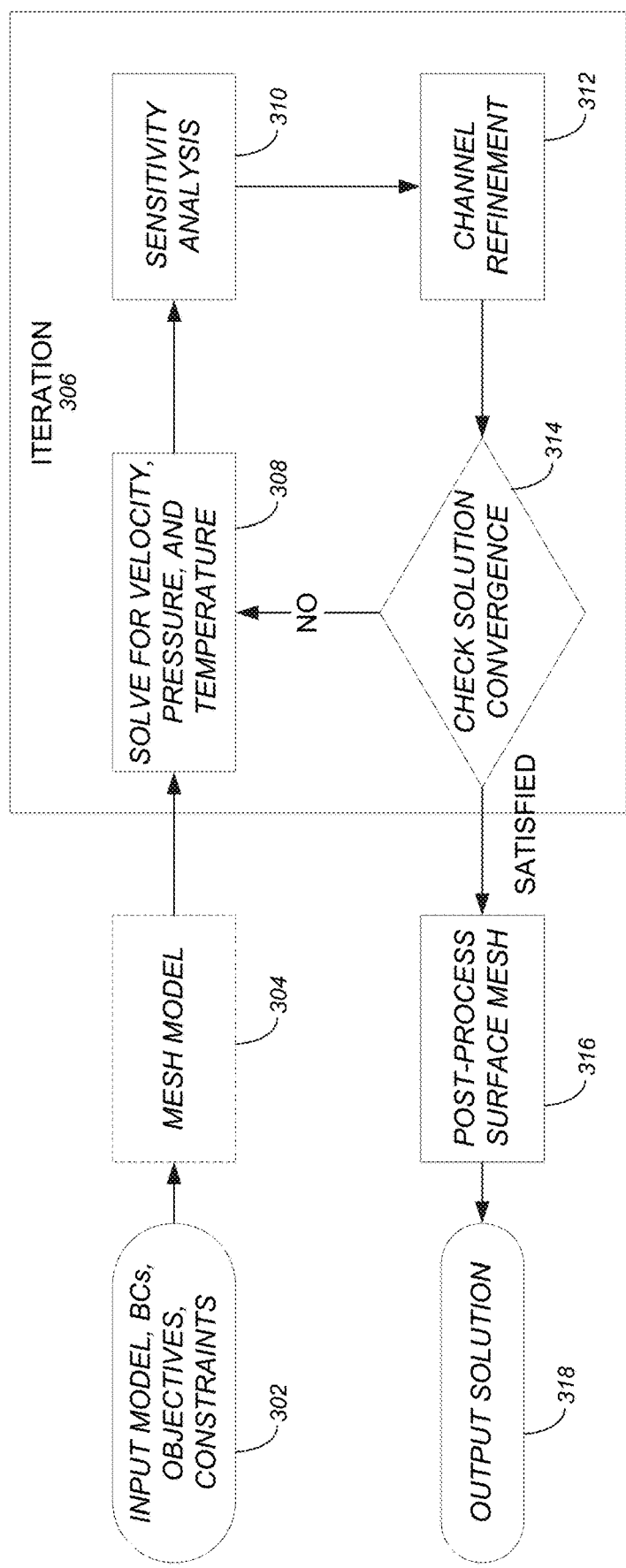
FIG. 3 illustrates a flowchart for channel generation in accordance with one or more embodiments of the invention.

FIG. 3 illustrates a flowchart for channel generation (e.g., performed by a topology optimizer solver) in accordance with one or more embodiments of the invention. In this regard, FIG. 3 illustrates the logical flow for generating (via iterative topology optimization), one or more channel designs corresponding to input data. Similar to step 102, the data is input at step 302. Such input data may include the input model (e.g., geometry of an object to be cooled), boundary conditions, design objectives, and constraints. At step 304, the input data may be used to create/generate an mesh model (e.g., a voxel mesh) required by the next iteration process 306. The iterative process 306 specifies the steps that may be iterated to generate the convective channels (e.g., channel generation step 104).

Iterative numerical simulation (of the channel flow and solids in the design domain) gives basic information to support shape generation in topology optimization. For each certain channel design that is generated in each iteration in the process 306, the pressure P, velocity V and temperature T fields are obtained (i.e., solved/simulated in step 308) for the flow domain from simulation, while temperature T field is obtained for the solids in the design domain. Various techniques can be used to perform such simulation 308, including the finite element method and the finite volume method, both of which require discretization of the whole domain into elements through a meshing process 304. The simulation 308 provides a steady-state solution of P, V and T in each iteration. Thus, for each iteration in process 306, a channel flow and solids are numerically simulated to produce a steady-state solution of P, V, and T.

As an example, a finite volume method (FVM) may be used based on a voxel mesh 304, which is convenient to take advantage of high performance computing techniques such as a multi-grid iterative matrix solver. Moreover, GPU (graphics processing unit) parallelization may also be used to further increase the computational speed. This is very desirable since numerical simulation of multi-physics usually takes a substantial portion of the run time in a topology optimization procedure. The finite volume method (FVM) is usually used for solving computational fluid dynamics problems, and is mathematically a method for solving partial differential equations in the form of algebraic equations [Moukalled, Mangani and Darwish]. In FVM, values are calculated at discrete points representing small volume surrounding them on a meshed model. Volume integrals in a partial differential equation that contain a divergence term are converted to surface integrals, using the divergence theorem. The surface integrals are regarded as fluxes on the surfaces of each finite volume, they are summed over the whole mesh to form the algebraic equations together with BCs to solve for unknowns such as P, V and T.

The channel geometry generation 104 can be done using various techniques, such as a level-set method [Challis and Guest] that moves the boundary surface of the channel, or an element based [Huang and Xie] method that removes or adds elements to the discretised model. The criteria for geometry variation are the sensitivities of the discretised elements. In this regard, at step 310, a sensitivity analysis may be conducted. Specifically, a sensitivity may be derived from taking the derivative of an objective function or constraint. A sensitivity is calculated using/based on the simulated velocity, pressure and temperature (e.g., obtained at step 308), or other geometry information such as channel diameters. The objective functions and sensitivities are demonstrated but not limited to the following forms:

For channel pressure drop consideration, the objective is to minimize the flow kinetic energy loss. The sensitivity $\alpha_{fi}$ for a fluid element is taken as:

$$\alpha_f^i = u^T k_f^i u \quad (5)$$

where $u^T$ is the transpose of the fluid velocity vector, $k_f^i$ is the elemental matrix defined as $$k_f^i = \rho_f \int_\Omega N^T (u \cdot \nabla) N dv + \mu \int_\Omega (\nabla \cdot N)^T \nabla \cdot N dv \qquad (6)$$

where i denotes the element ID in a discretized model, N is the elemental interpolation function that gives the velocity of any particular point within the ith element $u=Nu^i$, with $u^i$ being the velocity vector combining all nodes of the ith element. $\Omega$ is the total flow domain under consideration. As previously, the subscript f indicates fluid, and $\mu$ the fluid viscosity. For a slow flow, the first term in Eq. 6 can be dropped.

For heat removal consideration, the objective is to maximize the total thermal compliance. The sensitivity for solids, indicated as $\alpha_e^i$, can be taken as:

$$\alpha_e^i = T^T k_s^i T \qquad (7)$$

where $T^T$ is the transpose of the temperature vector T, and $k_s^i$ is the elemental matrix defined as $$k_s^i = k_s \int_\Omega N^T \nabla \cdot \nabla N dv \qquad (8)$$

where i denotes the element ID in a discretized model, N is the elemental interpolation function that gives the temperature of any particular point within the ith element $T=NT^i$, with $T^i$ being the temperature vector combining all nodes of the ith element, and $k_s$ is the thermal conductivity of the solid.

For temperature distribution consideration, the objective is to lower the temperature globally or just to lower the temperature of a particular location. The sensitivity $\alpha_t^i$ for solids can be taken as:

$$\alpha_t^i = T^T k_s^i T_j \qquad (9)$$

where i denotes the element ID in the discretized model, and $k_s^i$ is the same elemental matrix in Equation (8). T denotes the temperature vector as the temperature solution. $T_j$ is the adjoint temperature solution resulted from solving an adjoint system where an artificial heat load is applied to where the temperature is to be lowered. If the global temperature is of concern instead of only the temperature of a particular location, the points of temperature interest are where the highest temperatures are. The locations of highest temperatures usually vary in the optimization history as the channel geometry changes. The values of the artificial heat loads can be scaled in such a manner that the highest heat load goes to the location with the highest temperature, the second highest heat load goes to the location with the second highest temperature, and so on.

The fluids counterparts of thermal compliance and temperature sensitivities can take the similar form as in Equations (7) and (9), with the elemental matrix $k_s^i$ replaced by a modified one, $k_{ft}^i$, accounting for flow convection as follows:

$$k_{ft}^i = k_f \int_\Omega N^T \nabla \cdot \nabla N dv + \rho_f C_p \int_\Omega N^T u \cdot \nabla N dv \qquad (10)$$

Alternatively, for more accuracy but in the price of more computational cost, a standard full adjoint method can be used to get the exact sensitivities. A standard adjoint method [Dilgen, Dilgen, Fuhrman, Sigmund and Lazarov] in topology optimization appends the objective function with additional adjoint equations, which usually are the status equations of the underlying physics such as the equations (1)-(4), and derives the sensitivities from this combined objective function.

For most conformal cooling cases, the channel can be an arbitrary shape which promotes advanced cooling performance. However, if channel manufacturability is considered, a more regular pipe-like solution may be desired.

To get a regular shape of the resulting channels for manufacturability purposes, e.g., making the channels to be pipes instead of being arbitrary cross-sections, or making the channel lines straight for drilling preferences, channel geometry information is used. An algorithm of unsupervised machine learning may be used to cluster channel elements into individual channels, and to identify the elements at the channel centre-lines.

The iterative topology optimization solver (i.e., iterative process 306) may generate scattered point clouds to represent the shape of fluid regions (of the object). The scattered point clouds may be converted into straight segments (that go through the scattered point clouds) that are used as center lines of channels of the channel designs. To make manufacturable channels based on the point clouds, one or more of the following techniques may be used:

1. Point Clouds are Clustered

Clustering is an algorithm of unsupervised machine learning. Scattered point clouds are clustered in high dimensional space based on geometry, connectivity, temperature distribution and manufacturability. As a channel front moves from inlets to outlets, scattered points are clustered by k-means clustering, which includes two steps: (1) find the best number of cluster centers at each cross section; (2) assign points to the nearest cluster centers, so that the total distance from each point to its cluster center is minimized.

2. Create a Virtual Network Based on Part Shapes

Channels are around parts to be manufactured. Part shapes are recognized and classified into base shapes by supervised machine learning, and then a network is formed around the part based on the base shape and cluster centres. Shape recognition may be based on a convolutional neural network (e.g., that can be trained from scratch by self-created training samples.

3. Best Routes Along Point Clouds are Determined by Graph Theory

A graph is formed based on the initial point clouds, including cluster centres, and each point is connected with adjacent points while the distance is weighted based on connectivity, temperature distribution and manufacturability. The virtual network formed by cluster centres is embedded in the graph. Cluster centres are connected by shortest paths determined by Graph Theory [Siek]. A shortest path is represented by a series of points selected from the initial point clouds. At this stage, scattered point clouds have been converted into a network with channel-like pipes, but the pipes may not be straight.

4. Each Path can be Straightened by Dimensionality Reduction

Dimensionality Reduction is another algorithm of unsupervised machine learning. Dimensionality Reduction is based on Principal Component Analysis. Principal Component Analysis is a statistical procedure to convert samples of a set of correlated variables into a smaller set of uncorrelated variables, which are called principal components. The first principal component has the largest variation. Points are represented by three coordinates in general. When a group of points form a pipe-like shape roughly, it is possible to find a subset of principal variables based on Principal Component Analysis, so that the pipe-like shape can be represented by one or two parameters. During the generation of channels, point clouds for each path are projected to a lower dimensional space represented by principal components. A straight line based on the first component will replace the original path if that component is dominant, otherwise the path will be split into two segments.

With the four major procedures mentioned above, the scattered point clouds are converted into straight segments going through the initial point clouds. The straight segments can be used as the centre lines of channels.

With the known locations of centre-line elements, all channel elements can be marked with a layer number, depending on the distance of it to its local centre-line element. The element on the centre-line has a layer number of 1, the next layer of elements has a layer number of 2, and so on. This information can be used to modify the channel geometry during the optimization iteration. One of the possible ways is to derive a geometry sensitivity that favours those elements adjacent to the centrelines when determining element addition/removal during the optimization iteration, i.e. keeping centre-line-adjacent elements in the channel design while tending to leave other elements out of the design; the scheme of the sensitivity can be, not limited to, one of the followings:

$$\alpha_g^i = \left(1 - \frac{L_i - 1}{L_{max}}\right)^2 \quad (11)$$

$$\alpha_g^i = \frac{1}{L_i} \quad (12)$$

$$\alpha_g^i = L_{max} - L_i + 1 \quad (13)$$

where $\alpha_g^i$ is the geometry sensitivity, $L_i$ is the layer number of the element, and $L_{max}$ is the maximum layer number considered.

All of the above sensitivities can be normalized using the following scheme:

$$\hat{\alpha}^i = \frac{\alpha^i}{\sqrt{\sum_{i=1}^{m}(\alpha^i)^2}} \quad (14)$$

where $\alpha^i$ is one of $\alpha_f^i$, $\alpha_e^i$, $\alpha_t^i$, $\alpha_g^i$, or other sensitivities for other objectives, and $\hat{\alpha}^i$ is the corresponding normalized sensitivities $\widehat{\alpha_f^i}$, $\widehat{\alpha_e^i}$, $\widehat{\alpha_t^i}$, $\widehat{\alpha_g^i}$. Then using corresponding weighting factors $w_f$, $w_e$, $w_t$, $w_g$ etc. that can be user-defined, the normalized sensitivities can be combined to create a multi-objective sensitivity $\beta_i$ as follows:

$$\beta_i = w_f \widehat{\alpha_f^i} + w_e \widehat{\alpha_e^i} + w_t \widehat{\alpha_t^i} + w_g \widehat{\alpha_g^i} + \quad (15)$$

A sensitivity filtering scheme can be used to smooth the above combined sensitivity $\beta_i$ into a smoothed final sensitivity $\tilde{\beta}_i$.

$$\tilde{\beta}_i = \frac{(r_{min} - r_j)\beta_j}{\sum_{j=1}^{n}(r_{min} - r_j)} \quad (16)$$

where $r_{min}$ is a pre-defined radius, which defines a sphere area with the centre location of the $i^{th}$ element, and every element denoted by j inside this area are taken to calculate the smoothed sensitivity according to the above equation. Note that both subscript i and j indicate element number.

With the sensitivities for all elements determined, in each optimization iteration, an optimization algorithm may be used to modify/refine the channel geometry at step 312. In other words, for each iteration, a geometry of the channel designs is refined. For example, a Method of Moving Asymptotes or an Optimality Criteria method can be used to determine which elements to be switched from solid to fluid or vice versa. Any other mathematical optimization algorithm can be used within the scope of this invention. Alternatively, a level-set method can be used, where the sensitivities on the channel boundary surface are converted to surface advect speed, determining the surface movement to generate a geometry for the next iteration. Particularly a hybrid level-set method can be used: first the surface is discretised into triangle elements, then the final sensitivity defined in Equation (16) for those elements on the surface are each assigned to the closest surface triangle element and are scaled by a scaling factor λ to become the surface advect speed of each surface triangle, which indicates how far the relevant triangle should be moved in its own normal direction. The scaling factor λ can be determined using a bi-section method which search for the right value between a range iteratively: in each iteration the surface triangles are moved with the surface advect speed determined by the λ of this iteration, and calculate the total fluid volume, then adjust the λ value by comparing the resulted fluid volume with the targe volume.

In view of the above, once channel refinement at step 312 has been completed, embodiments may check for solution convergence at step 314. If the solutions do not converge, another iteration is conducted beginning with step 308. However, if solution convergence is satisfied, further iterations may not be necessary, and the process continues with post-processing at step 316 (see below). The solution convergence is checked usually by calculating how much the objective function is changing between two adjacent, or within a number of consecutive, iterations; alternatively, the temperature of the object to be cooled or the total heat removed can also be used to estimate the solution change; if the change is small enough (e.g., within a threshold range), the solution is regarded as converged.

Postprocess Surface Mesh 316

In step 316, output of the optimization iterations 306 can be processed so that it can be included in the existing workflow of mold designers. This process includes the extraction of the path/centreline to help users utilize a channel generation technique within a desired workflow. Further, users can edit cooling channels to introduce various downstream manufacturing requirements. Specifically, in traditional workflows, mold designers construct cooling channels for molds using curves defining paths. Cooling channels are modelled by sweeping 2D circular cross sections along these paths. These paths (curve models) and the sweeping cross sections are modified based on various requirements such as manufacturability and quality of the molded parts.

The output of the optimization process (i.e., iteration 306) is (are) a tessellated model(s) representing the boundary of cooling channels for the input model/object. To fit into the existing workflow of mold designers, embodiments of the invention propose to construct one-dimensional (1D) (curve models) approximation of these tessellated models as a post processing step 316. This constructed curve model will be such that it will capture the underlying layout of the cooling channel. Various algorithms exist for constructing shape capturing curve models from the tessellated models. Medial axis extraction is the most popular among these techniques [Saha, Borgefors, and Baja]. However, the major drawback of the medial axis extraction is its sensitivity to minor variations in boundary resulting in very complicated curve models of shapes. To obviate the issues related to medial axis extraction, embodiments of the invention utilize various approximation techniques. One approximation technique is referred to as skeleton extraction by the Laplacian method. Alternative skeletonization techniques that may be used include the techniques described in [Au] and [Cao]. Embodiments of the invention may utilize a skeletonization technique that includes the following three steps.

1. Shrinking the Mesh Model:

In the shrinking phase, the mesh model with nodes $P=\{p_i\}$ is contracted to within a threshold range (very close) of the final skeleton model. This contraction formulation involves two components: (1) Laplacian differential constraint (L) and (2) position constraint ($\{p_i-p_i'\}$). These two constraints are satisfied in the least square sense. In the least square formulation, the two constraints are weighted with two weights and these weights are adjusted with the amount of shrinkage resulting from the prior iterations. The iteration is continued until the change in total area between two shrunken mesh models obtained in two subsequent iterations is within a threshold.

2. 1D Polygonal Model:

The output of the last step results in a highly deformed mesh model reduced almost to the shape of a skeleton model. In this step, 1D skeleton models are constructed from this deformed mesh model with a series of collapsing steps. Deformed mesh nodes are collapsed based on the new adjacency relations in the sense that all nodes within a ball of a defined (small/threshold) radius are collapsed to a single node. The radius of this ball may be determined based on the size of the bounding box. The collapse step is followed by reconnecting selected (in collapse stage) nodes based on the original adjacency relations. The reconnection step may result is new triangles and edges as some of these triangles are removed by the edge collapse based on angle, edge length, and topology criterion for obtaining polygonal representation of cooling channels.

3. Adjust the Curve Model:

The polygonal model obtained from the previous step may go off the center or even go outside the original mesh model. In this step, nodes of the polygonal models are adjusted to move the polygonal model to the center of the mesh model by associating the nodes of the polygonal model back to the nodes on the original mesh model that collapse a node of the polygonal model. The nodes of the polygonal models are moved near to the centroid of the associated nodes of the original mesh [Au].

Result Selection 106

For each set of inputs 102/302 there is an optimized design solution output 318. This may result in many design solutions. A selection step 106 can be used to filter out those output solutions 318 not as competitive as others (i.e., to select one or more of the generated channel designs). A number of selection criteria can be used such as estimated manufacturing cost and required tooling.

Once selected at step 106, the final solution (i.e., selected channel design) is output at step 108.

Advantages

Embodiments of the invention provide many advantages over the prior art. Such advantages may be identified via one or more of the following unique aspects.

Embodiments of the invention start with creating multiple sets of inputs for a topology optimization technique, which generates a cooling channel solution for each set of inputs. All the solutions are output as re-usable and editable geometry models.

Embodiments of the invention combine multiple design objectives and constraints, including but not limited to, flow pressure drop, design domain thermal energy, hot object temperature, channel shape regularization, fluid volume.

The temperature may be controlled globally, e.g., the locations of the highest temperatures are identified in each iteration and their temperatures are automatically brought down in the next iteration.

Centre-lines of the channels may be identified in the optimization iteration, which can be simplified lines with certain modifications, e.g., a channel line translated into segments of straight lines.

A geometry sensitivity can be used based on channel geometry information, i.e., simplified geometry centre-lines. This sensitivity, in a combination of sensitivities of other objectives, drives the solution to be both efficient in heat removal and geometrically simple for manufacturing.

After channel generation, the channel design can be further simplified into 1D lines representing the channel topology with diameter information, in an easily editable format, ready for further design processes if required.

A result selection step can be used to filter the solutions if multiple input sets were involved; the selection is based on criteria such as cooling performance and manufacturing cost.

Figure 4A:
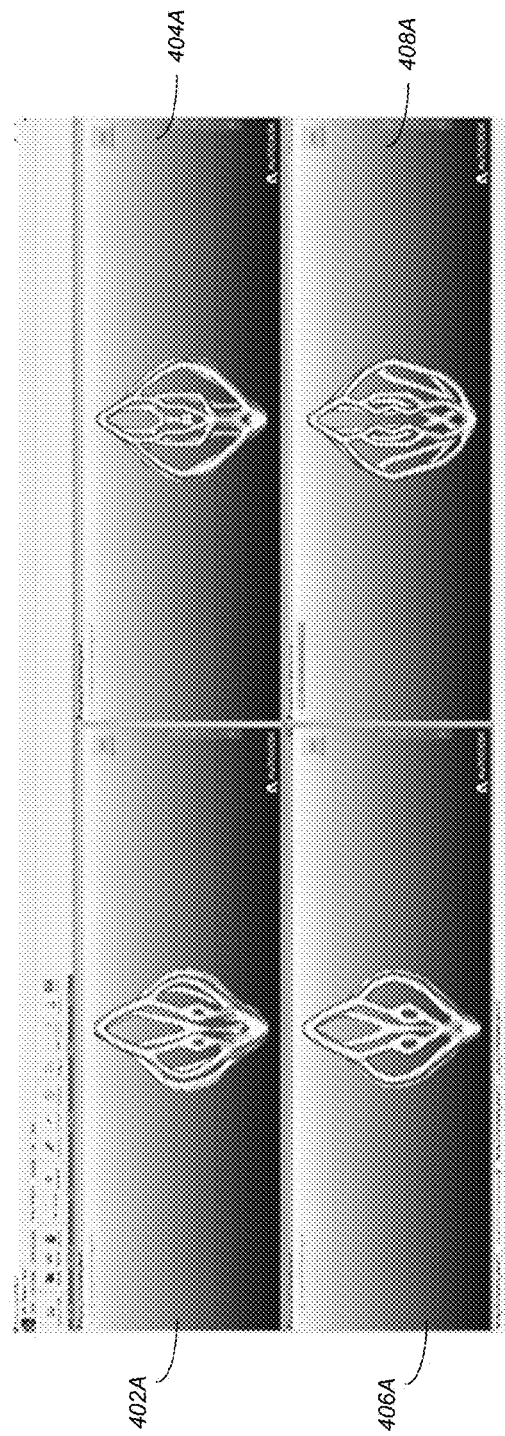
FIGS. 4A and 4B illustrate a resulting channel design solution of a satellite dish example front view (FIG. 4A) and back view (FIG. 4B) in accordance with one or more embodiments of the invention.
Figure 4B:
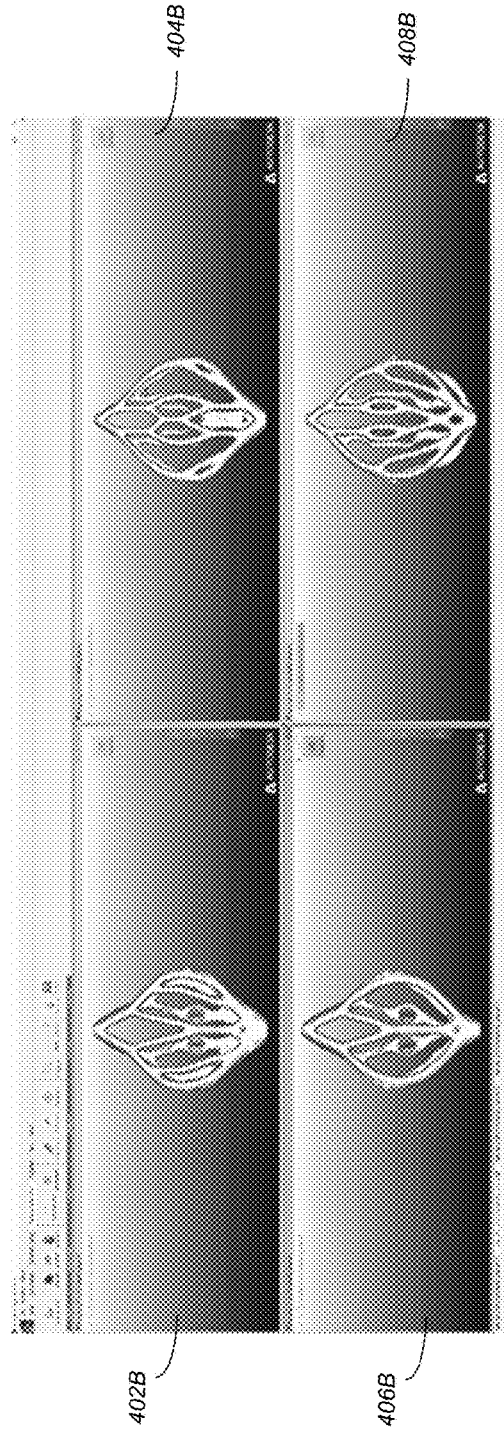

FIGS. 4A and 4B illustrate a resulting channel design solution of a satellite dish example front view (FIG. 4A) and back view (FIG. 4B) in accordance with one or more embodiments of the invention. FIGS. 4A and 4B each demonstrate four channel solutions 402-408 (i.e., 402A-408A and 402B-408B). Each channel 402-408 is obtained with different combinations of parameters. Although they look different from each other, they all address the design objectives of: pressure drop minimization—the channels 402-408 are smoothed curved without sharp bends that may create significant pressure drop; heat removal maximization and temperature distribution—the channels cover large area over the satellite dish surface in order to convey heat efficiently and evenly.

Hardware Embodiments

Figure 5:
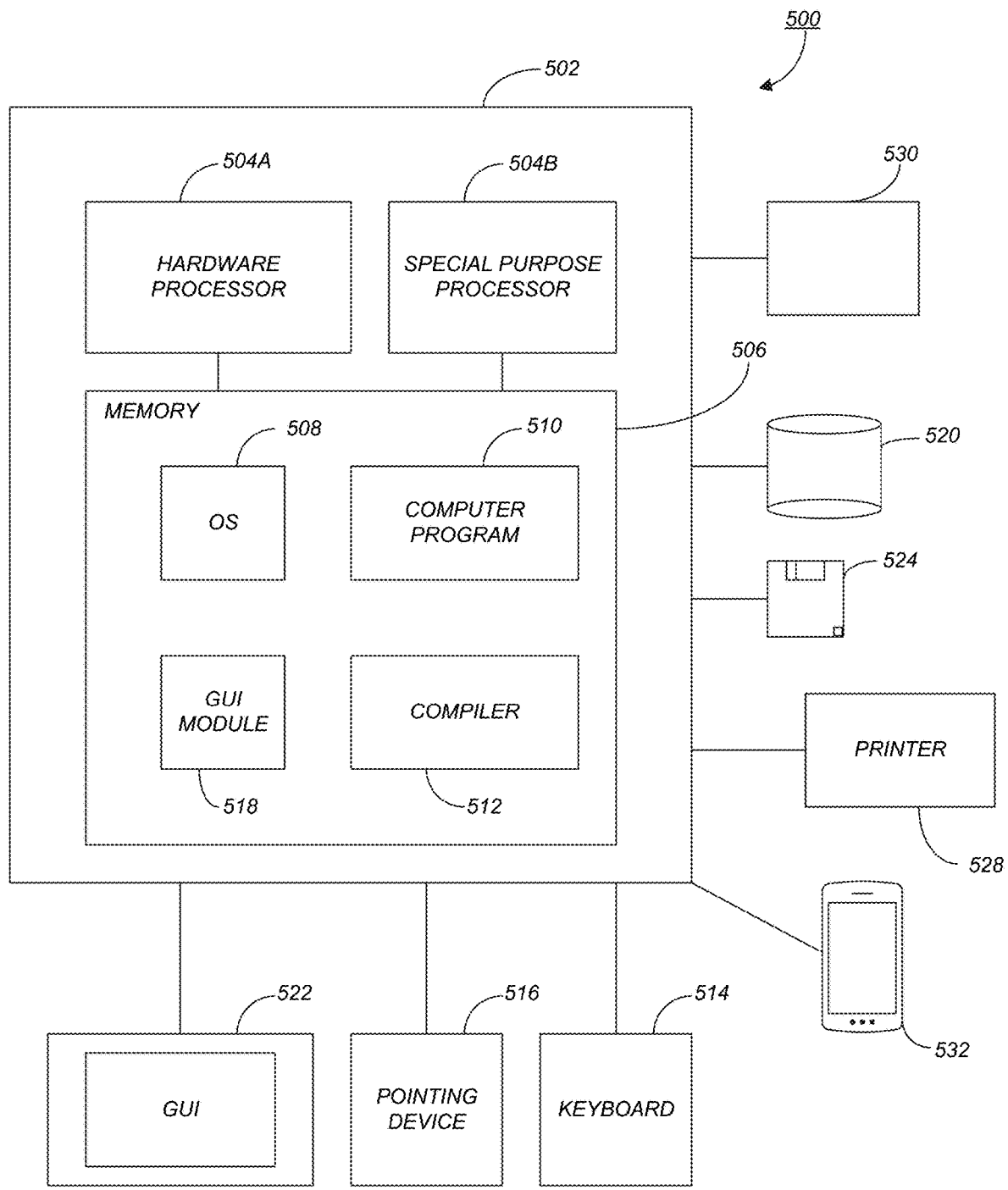
FIG. 5 is an exemplary hardware and software environment used to implement one or more embodiments of the invention.

FIG. 5 is an exemplary hardware and software environment 500 used to implement one or more embodiments of the invention. The hardware and software environment includes a computer 502 and may include peripherals. Computer 502 may be a user/client computer, server computer, or may be a database computer. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, the some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
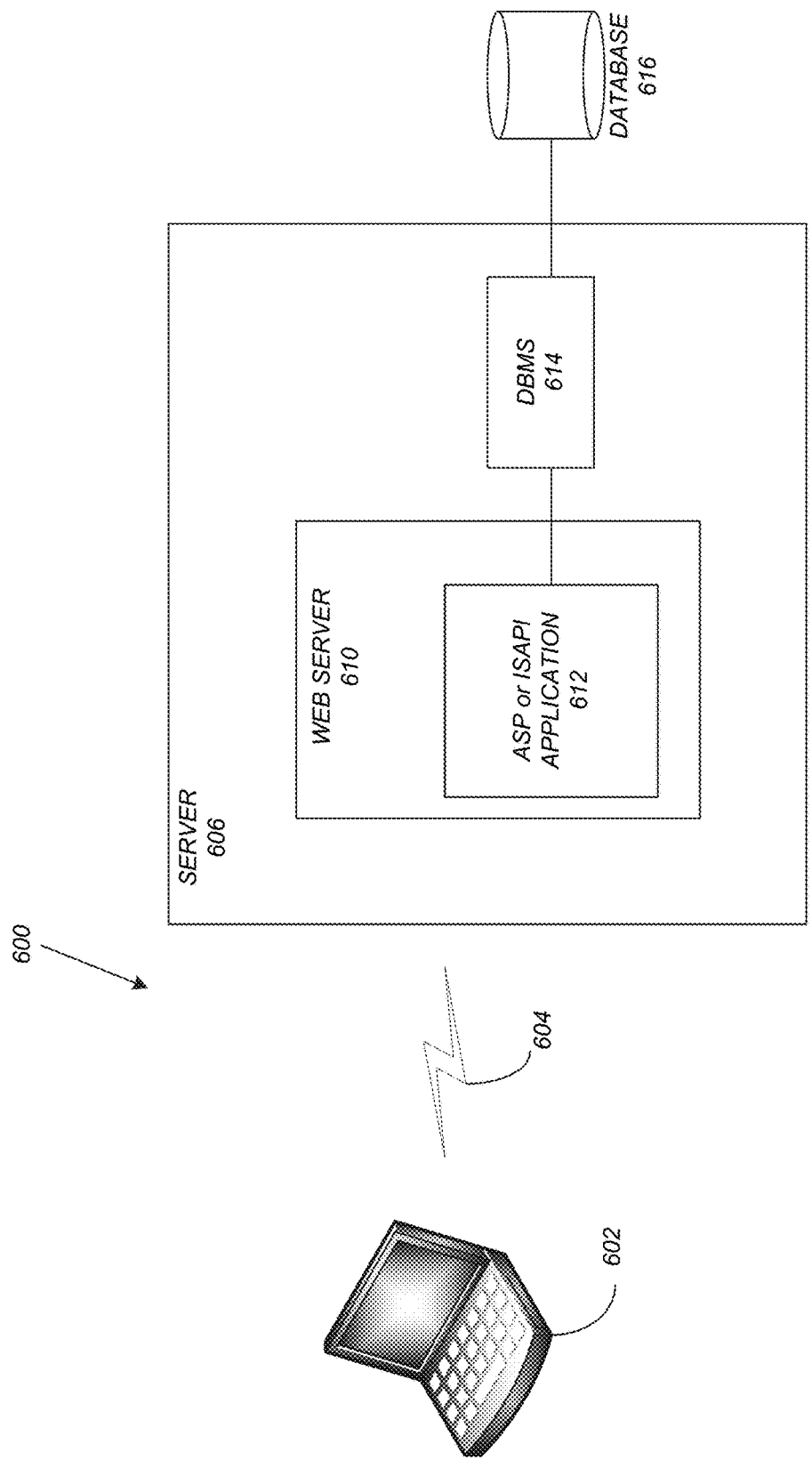
FIG. 6 schematically illustrates a typical distributed/cloud-based computer system using a network to connect client computers to server computers in accordance with one or more embodiments of the invention.

FIG. 6 schematically illustrates a typical distributed/cloud-based computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Further, in a cloud-based computing system, resources (e.g., storage, processors, applications, memory, infrastructure, etc.) in clients 602 and server computers 606 may be shared by clients 602, server computers 606, and users across one or more networks. Resources may be shared by multiple users and can be dynamically reallocated per demand. In this regard, cloud computing may be referred to as a model for enabling access to a shared pool of configurable computing resources.

Clients 602 may execute a client application or web browser and communicate with server computers 606 executing web servers 610. Such a web browser is typically a program such as MICROSOFT INTERNET EXPLORER, MOZILLA FIREFOX, OPERA, APPLE SAFARI, GOOGLE CHROME, etc. Further, the software executing on clients 602 may be downloaded from server computer 606 to client computers 602 and installed as a plug-in or ACTIVEX control of a web browser. Accordingly, clients 602 may utilize ACTIVEX components/component object model (COM) or distributed COM (DCOM) components to provide a user interface on a display of client 602. The web server 610 is typically a program such as MICROSOFT'S INTERNET INFORMATION SERVER.

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S TRANSACTION SERVER (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606. Embodiments of the invention are implemented as a software application on a client 602 or server computer 606. Further, as described above, the client 602 or server computer 606 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Cao] Cao, J., Tagliasacchi, A., Olson, M., Zhang, H., & Su, Z. (2010, June). Point cloud skeletons via Laplacian based contraction. In *Shape Modeling International Conference (SMI)*, 2010 (pp. 187-197). IEEE.

[Au] Au, Oscar Kin-Chung, of al. "Skeleton xtraction by mesh contraction." *ACM Trsansactions on Graphics (TOG)*. Vol. 27. No. 3. ACM, 2008.

[Moukalled, Mangani and Darwish] The Finite Volume Method in Computational Fluid Dynamics, 2015, Springer

[Challis and Guest] Challis V J, Guest J K, Level set topology optimization of fluids in Stokes flow, 2009, International Journal for Numerical Methods in Engineering.

[Huang and Xie] Huang X, Xie Y M, Convergent and mesh-independent solutions for the bi-directional evolutionary structural optimization method, 2007, Finite Elements in Analysis and Design.

[Dilgen, Dilgen, Fuhrman, Sigmund and Lazarov] Dilgen S B, Dilgen C B, Fuhrman D R, Sigmund O and Lazarov B S, Density based topology optimization of turbulent flow heat transfer systems, 2018, Structural and Multidisciplinary Optimization.

[Saha, Borgefors, and Baja] P K Saha, G Borgefors, G S di Baja, A survey on skeletonization algorithms and their applications, 2016, Pattern Recognition Letters.

[Siek] SJeremy Siek, Lie-Quan Lee, and Andrew Lumsdaine, The Boost Graph Library (BGL), 2001, www.boost.org/doc/libs/1_66_0/libs/graph/doc/.

What is claimed is:

1. A computer-implemented method for designing a convective cooling channel in a computer, comprising:
   (a) acquiring input data, wherein the input data comprises:
      (1) a geometry of an object to be cooled;
      (2) multiple design objectives; and
      (3) one or more boundary conditions;
   (b) automatically generating multiple channel designs corresponding to the input data by:
      (1) generating, using a pre-processor and based on the input data, an initial channel design having an arbitrary 3D geometry;
      (2) performing an iterative topology optimization process using the initial channel design to start the optimization;
      (3) numerically simulating channel flow and solids of the channel design using a 3D voxel-based finite volume method to solve fluid dynamics equations for fluid flow and producing a steady-state solution;
      (4) checking if performance results from the simulation meet channel design selection criteria;
      (5) if the performance results from the simulation do not meet the channel design selection criteria, refining geometry of the channel design to obtain another channel design;
      (6) repeating steps (3) to (5) until the performance results from the simulation meet the channel design selection criteria;

(7) selecting the channel design as a generated channel design and generating a geometric model with the channel design;
wherein the generated geometric model has an arbitrary shape that is reusable and editable;
(8) if desired number of channel designs have not been generated, generating, using a pre-processor and based on the input data, another initial channel design having an arbitrary 3D geometry;
(9) repeating steps (2) to (8) until the desired number of channel designs have been generated;
wherein, the generating the multiple channel designs further comprises:
for each of the multiple channel designs, numerically simulating a channel flow and solids to produce a steady-state solution of pressure P, velocity V, and temperature T;
calculating a shape sensitivity of the channel design comprising the generated geometric model with respect to P, V, and T; and
using the calculated shape sensitivity to generate a shape of the channel design for the next iteration of topology optimization; and
(c) outputting the geometric models generated by the selected channel designs.

2. The computer-implemented method of claim 1, wherein acquiring the input data comprises:
receiving the geometry of the object as input from a user;
receiving the design objective as input from the user; and
a pre-processor on a computer automatically generating the one or more boundary conditions.

3. The computer-implemented method of claim 1, wherein the one or more boundary conditions comprise:
a coolant inlet location;
a coolant outlet location;
an inlet coolant type;
an inlet coolant temperature; and
an outlet pressure.

4. The computer-implemented method of claim 1, wherein the generating the multiple channel designs comprises:
grouping the input data into input data sets, wherein each set contains a combination of the geometry, the design objective, and one or more boundary conditions; and
for each input data set, generating an initial channel design that corresponds to the input data set.

5. The computer-implemented method of claim 1, wherein the iterative topology optimization comprises:
generating one or more scattered point clouds to represent a shape of fluid regions of the object;
converting the one or more scattered points clouds into straight segments going through the one or more scattered point clouds; and
utilizing the straight segments as a center line of channels of the channel design.

6. The computer-implemented method of claim 1, wherein the generating the multiple channel designs comprises:
outputting one or more tessellated models representing one or more cooling channel boundaries; and
constructing a one-dimensional curve model approximation for each of the one or more tessellated models, wherein the one-dimensional curve model approximation captures an underlying layout of the convective cooling channel.

7. The computer-implemented method of claim 1, wherein the multiple design objectives comprise:
a minimization of channel flow pressure drop;
a maximization of heat removal in the channel; and
the multiple design objectives are subject to constraints based on:
a temperature range;
a temperature uniformity;
a fluid volume; and
a channel manufacturability.

8. The computer-implemented method of claim 1, wherein:
the optimization adds geometry information to the one or more initial cooling channel designs by:
moving a boundary surface of a channel of the one or more initial cooling designs.

9. A computer-implemented system for designing a convective cooling channel, comprising:
(a) a computer having a memory;
(b) a processor executing on the computer;
(c) the memory storing an application that is executed by the processor, wherein the application:
(1) acquires input data, wherein the input data comprises:
(A) a geometry of an object to be cooled;
(B) multiple design objectives; and
(C) one or more boundary conditions;
(2) automatically generates multiple channel designs corresponding to the input data by:
(A) generates, using a pre-processor and based on the input data, an initial channel design having an arbitrary 3D geometry;
(B) performs an iterative topology optimization process using the initial channel design to start the optimization;
(C) numerically simulates channel flow and solids of the channel design using a 3D voxel-based finite volume method to solve fluid dynamics equations for fluid flow and producing a steady-state solution;
(D) checks if performance results from the simulation meet channel design selection criteria;
(E) if the performance results from the simulation do not meet the channel design selection criteria, refines geometry of the channel design to obtain another channel design;
(F) repeats steps (C) to (E) until the performance results from the simulation meet the channel design selection criteria;
(G) selects the channel design as a generated channel design and generates a geometric model with the channel design;
wherein the generated geometric model has an arbitrary shape that is reusable and editable;
(H) if desired number of channel designs have not been generated, generates, using a pre-processor and based on the input data, another initial channel design having an arbitrary 3D geometry;
(I) repeats steps (B) to (H) until the desired number of channel designs have been generated;
wherein the multiple channel designs are generated by:
for each of the multiple channel designs, numerically simulating a channel flow and solids to produce a steady-state solution of pressure P, velocity V, and temperature T; and
calculating a shape sensitivity of the channel design comprising the generated geometric model with respect to P, V, and T; and using the calculated shape sensitivity to generate a shape of the channel design for the next iteration of topology optimization; and (3) outputs the geometric models generated by the selected channel designs.

10. The computer-implemented system of claim 9, wherein the application acquires the input data by:
   receiving the geometry of the object as input from a user;
   receiving the design objective as input from the user; and
   pre-processor on a computer automatically generating the one or more boundary conditions.

11. The computer-implemented system of claim 9, wherein the one or more boundary conditions comprise:
   a coolant inlet location;
   a coolant outlet location;
   an inlet coolant type;
   an inlet coolant temperature; and
   an outlet pressure.

12. The computer-implemented system of claim 9, wherein the application generates the multiple channel designs by:
   grouping the input data into input data sets, wherein each set contains a combination of the geometry, the design objective, and one or more boundary conditions; and
   for each input data set, generating an initial channel design that corresponds to the input data set.

13. The computer-implemented system of claim 9, wherein the iterative topology optimization comprises:
   generating one or more scattered point clouds to represent a shape of fluid regions of the object;
   converting the one or more scattered points clouds into straight segments going through the one or more scattered point clouds; and
   utilizing the straight segments as a center line of channels of the channel design.

14. The computer-implemented system of claim 9, wherein the application generates the multiple channel designs by:
   outputting one or more tessellated models representing one or more cooling channel boundaries; and
   constructing a one-dimensional curve model approximation for each of the one or more tessellated models, wherein the one-dimensional curve model approximation captures an underlying layout of the convective cooling channel.

15. The computer-implemented system of claim 9, wherein the multiple design objectives comprise:
   a minimization of channel flow pressure drop;
   a maximization of heat removal in the channel; and
   the multiple design objectives are subject to constraints based on:
      a temperature range;
      a temperature uniformity;
      a fluid volume; and
      a channel manufacturability.

16. The computer-implemented system of claim 9, wherein:
   the optimization adds geometry information to the one or more initial cooling channel designs by:
   moving a boundary surface of a channel of the one or more initial cooling designs.

* * * * *